(12) United States Patent
Hamashoji

(10) Patent No.: US 11,962,739 B2
(45) Date of Patent: Apr. 16, 2024

(54) DEVICE AND METHOD FOR GENERATING COLOR CONVERSION CORRECTION DATA, IMAGE FORMING APPARATUS, AND NON-TRANSITORY RECORDING MEDIUM

(71) Applicant: Hiroki Hamashoji, Kanagawa (JP)

(72) Inventor: Hiroki Hamashoji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/146,072

(22) Filed: Dec. 23, 2022

(65) Prior Publication Data
US 2023/0224423 A1 Jul. 13, 2023

(30) Foreign Application Priority Data
Jan. 7, 2022 (JP) .................................. 2022-001934

(51) Int. Cl.
*H04N 1/60* (2006.01)

(52) U.S. Cl.
CPC ......... *H04N 1/6016* (2013.01); *H04N 1/6005* (2013.01)

(58) Field of Classification Search
None
See application file for complete search history.

(56) References Cited

U.S. PATENT DOCUMENTS

| | | | |
|---|---|---|---|
| 7,206,094 B2 * | 4/2007 | Kumada ................ | H04N 1/603 358/1.18 |
| 2005/0036157 A1 * | 2/2005 | Takabayashi ...... | H04N 1/40006 358/1.9 |
| 2007/0229870 A1 * | 10/2007 | Doi ...................... | H04N 1/6033 358/1.9 |
| 2010/0195173 A1 * | 8/2010 | Dalrymple ............... | G06T 1/00 345/591 |
| 2013/0027759 A1 | 1/2013 | Nakamura | |
| 2019/0286033 A1 | 9/2019 | Hamashoji et al. | |

FOREIGN PATENT DOCUMENTS

| | | |
|---|---|---|
| JP | 2009-049839 | 3/2009 |
| JP | 2013-030996 | 2/2013 |
| JP | 2016-048905 | 4/2016 |

* cited by examiner

*Primary Examiner* — Barbara D Reinier
(74) *Attorney, Agent, or Firm* — IPUSA, PLLC

(57) ABSTRACT

A color conversion correction data generation device includes circuitry that acquires first chromaticity values obtained from conversion target image data and second chromaticity values of sample image data, the conversion target image data being image data to be subjected to color conversion, the sample image data being obtained by reading a printed sample; curve-fits chromaticity value correspondence data to generate color conversion correction data, the chromaticity value correspondence data being data in which the acquired first chromaticity values and the acquired second chromaticity values are associated with each other; and outputs the color conversion correction data for correcting image data obtained by subjecting the conversion target image data to the color conversion.

7 Claims, 7 Drawing Sheets

DEVICE AND METHOD FOR GENERATING COLOR CONVERSION CORRECTION DATA, IMAGE FORMING APPARATUS, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-001934, filed on Jan. 7, 2022, in the Japan Patent Office, the entire disclosure of which is hereby incorporated by reference herein.

BACKGROUND

Technical Field

The present disclosure relates to a device and a method for generating color conversion correction data, an image forming apparatus, and a non-transitory recording medium.

Related Art

In the related art, color conversion tables are used in color conversion to make the color of a printed material produced from a printer match the color of a printed sample.

An apparatus for generating a color conversion table is disclosed. Such an apparatus reads a desired printed material and a printed material output from a printer and generates a color conversion table from a correspondence relationship between the chromaticity values of points in the desired printed material and the chromaticity values of corresponding points in the printed material output from the printer.

Also disclosed is a technique for making colors from a printer match colors of a sample for the printer. In the disclosed technique, to improve the reproduction accuracy of a specific color, an output color value of the specific color is predicted from a correspondence relationship between sample data and measured color values, and the correspondence relationship between the sample data and the measured color values is corrected in accordance with a difference between the predicted output color value and a target color value.

SUMMARY

According to an embodiment of the present disclosure, a color conversion correction data generation device for generating color conversion correction data includes circuitry that acquires first chromaticity values obtained from conversion target image data and second chromaticity values of sample image data, the conversion target image data being image data to be subjected to color conversion, the sample image data being obtained by reading a printed sample; curve-fits chromaticity value correspondence data to generate color conversion correction data, the chromaticity value correspondence data being data in which the acquired first chromaticity values and the acquired second chromaticity values are associated with each other; and outputs the color conversion correction data for correcting image data obtained by subjecting the conversion target image data to the color conversion.

According to another embodiment of the present disclosure, an image forming apparatus includes circuitry that performs color conversion by using the color conversion correction data output from the color conversion correction data generation device described above and the conversion target image data to be subjected to color conversion. The image forming apparatus includes the color conversion correction data generation device, and an image forming device.

According to another embodiment of the present disclosure, a color conversion correction data generation method includes acquiring first chromaticity values obtained from conversion target image data and second chromaticity values of sample image data, the conversion target image data being image data to be subjected to color conversion, the sample image data being obtained by reading a printed sample; curve-fitting chromaticity value correspondence data to generate color conversion correction data, the chromaticity value correspondence data being data in which the acquired first chromaticity values and the acquired second chromaticity values are associated with each other; and outputting the color conversion correction data for correcting image data obtained by subjecting the conversion target image data to the color conversion.

According to another embodiment of the present disclosure, a non-transitory recording medium, when executed by one or more processors, causes the processors to perform a color conversion correction data generation method. The color conversion correction data generation method includes acquiring first chromaticity values obtained from conversion target image data and second chromaticity values of sample image data, the conversion target image data being image data to be subjected to color conversion, the sample image data being obtained by reading a printed sample; curve-fitting chromaticity value correspondence data to generate color conversion correction data, the chromaticity value correspondence data being data in which the acquired first chromaticity values and the acquired second chromaticity values are associated with each other; and outputting the color conversion correction data for correcting image data obtained by subjecting the conversion target image data to the color conversion.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
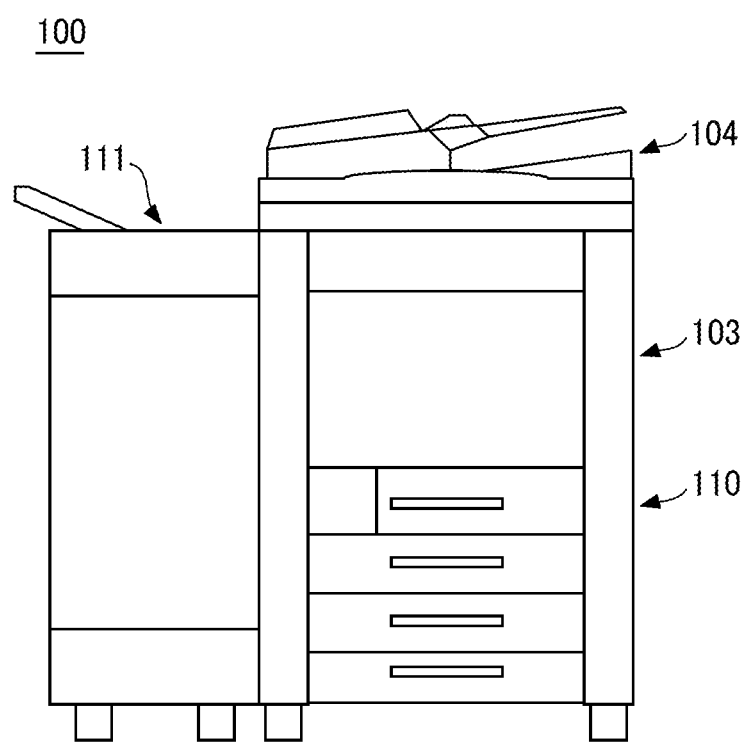
FIG. 1 is a schematic view illustrating a general arrangement of an image forming apparatus according to one or more embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure will be described hereinafter with reference to the drawings. In the drawings, substantially the same elements are denoted by the same reference numerals, and redundant descriptions thereof will be omitted.

An image forming apparatus including a color conversion correction data generation device according to an embodiment will be described hereinafter as an example. In an example, the image forming apparatus is a multi-function peripheral (MFP) having a function of printing an image on a recording medium such as a sheet of paper and a function of reading a printed material on which an image is formed. In the following embodiments, the phrases "forming an image" and "printing an image" are synonymous.

EMBODIMENTS

Example Configuration of Image Forming Apparatus 100

FIG. 1 illustrates an example of the general arrangement of an image forming apparatus 100. The image forming apparatus 100 includes a sheet feeding device 110, a printer engine 103, a scanner 104, and a post-processing device 111.

The sheet feeding device 110 feeds a recording medium such as a sheet from one of sheet feeding cassettes storing recording media such as sheets having different sizes to a point at which an image is to be formed by the printer engine 103. The printer engine 103 performs processes such as exposure, developing, charging, cleaning, fixing, and transfer to print an image on the recording medium. The scanner 104 reads the image formed on the recording medium by using an optical sensor, for example. The post-processing device 111 performs post-processing such as sorting or binding on printed materials on which images are formed by the printer engine 103.

Figure 2:
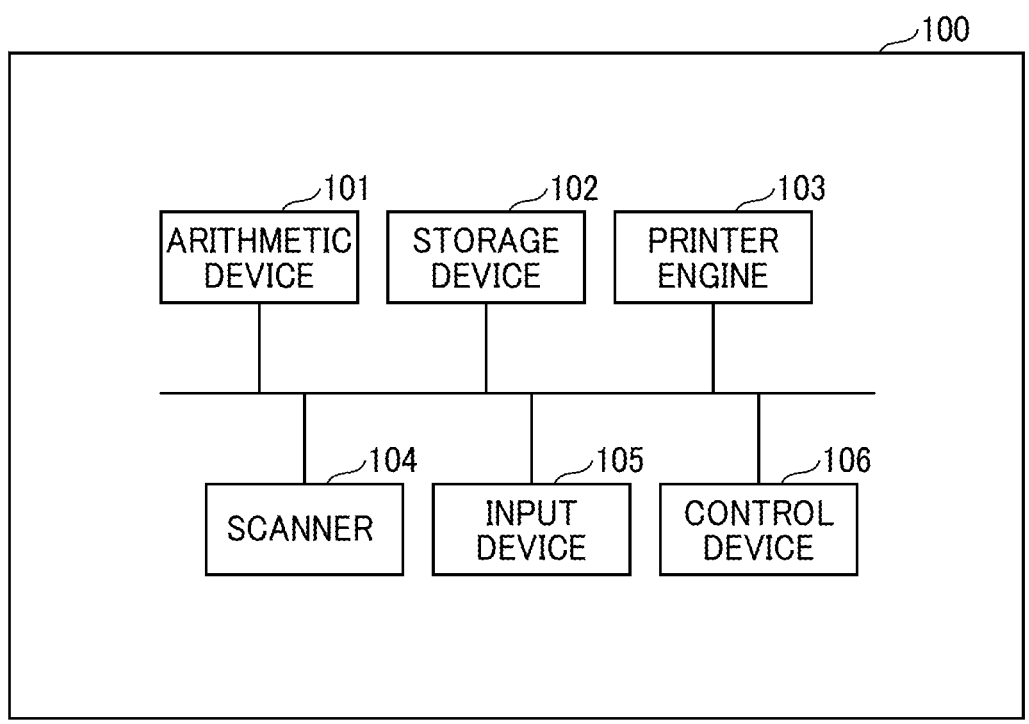
FIG. 2 is a block diagram illustrating an example hardware configuration of the image forming apparatus according to one or more embodiment of the present disclosure.

FIG. 2 is a block diagram illustrating an example hardware configuration of the image forming apparatus 100. The image forming apparatus 100 includes an arithmetic device 101, a storage device 102, an input device 105, and a control device 106.

In an example, the arithmetic device 101 is an electronic circuit such as a central processing unit (CPU) or an application specific integrated circuit (ASIC).

In an example, the storage device 102 is a memory. Examples of the memory include a random access memory (RAM), a read only memory (ROM), a hard disk drive (HDD), and a solid state drive (SSD).

The input device 105 is a device that receives data from a peripheral device or via a network, such as a network interface circuit or any desired interface.

The control device 106 is a device that controls the operation of each of the devices, such as a CPU or circuitry.

In an example, the image forming apparatus 100 is any combination of a reading apparatus such as a scanner that reads an image on a recording medium, an image processing apparatus including an arithmetic device and the like for processing image data, and an image forming apparatus that performs printing on a recording medium. In an example, the image forming apparatus 100 includes different devices that are connected to each other via a network.

Example Functional Configuration of Arithmetic Device 101

Figure 3:
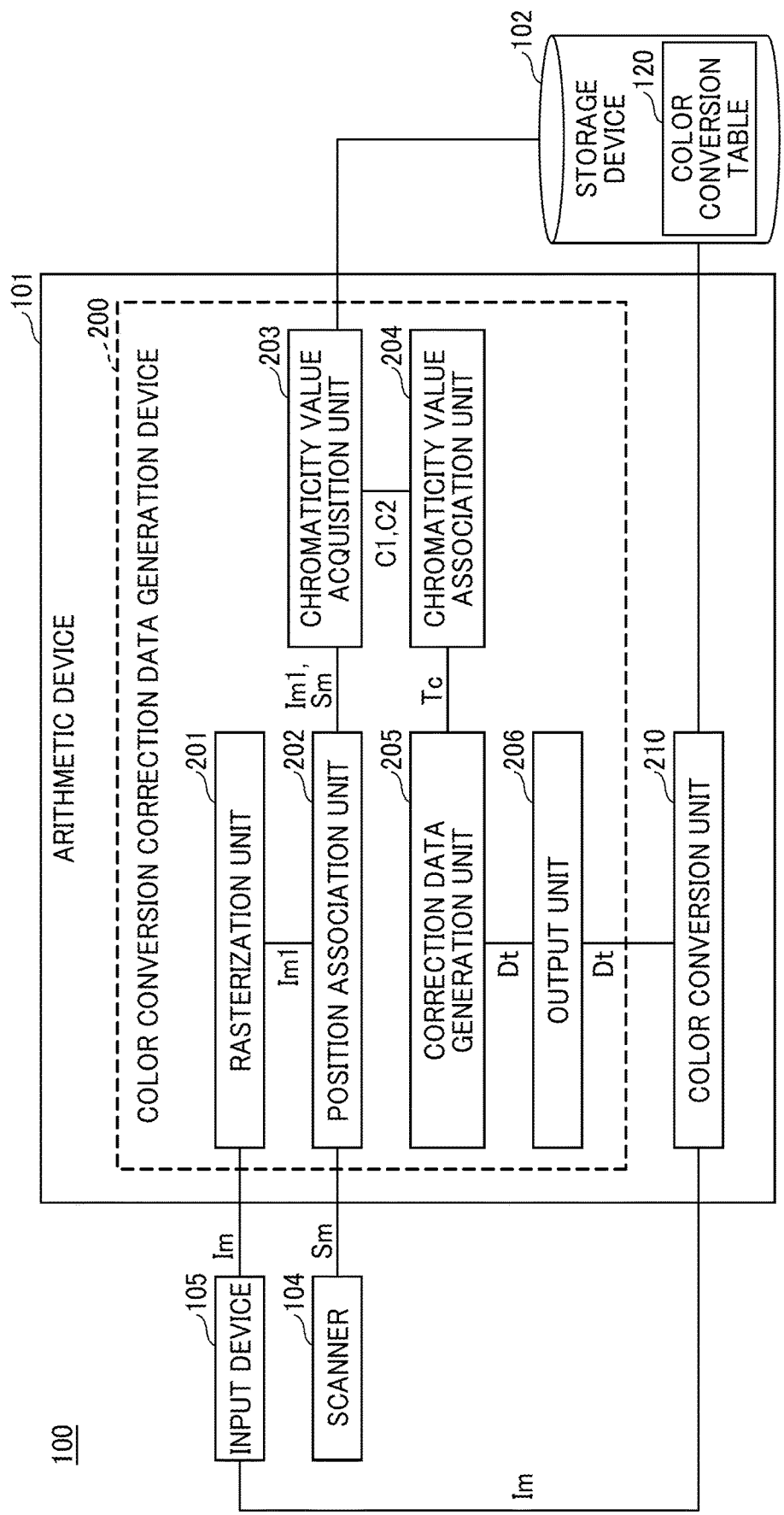
FIG. 3 is a block diagram illustrating an example functional configuration of an arithmetic device according to one or more embodiment of the present disclosure.

FIG. 3 is a block diagram illustrating an example functional configuration of the arithmetic device 101.

As illustrated in FIG. 3, the arithmetic device 101 includes a color conversion correction data generation device 200 and a color conversion unit 210.

In the arithmetic device 101, the color conversion correction data generation device 200 generates color conversion correction data Dt for correcting document image data Im that has been subjected to color conversion using a color conversion table 120.

In the arithmetic device 101, the color conversion unit 210 performs color conversion of the document image data Im using the color conversion table 120 and the color conversion correction data Dt output from the color conversion correction data generation device 200.

The color conversion correction data generation device 200 generates the color conversion correction data Dt by using the document image data Im, which is input from the input device 105, and sample image data Sm input from the scanner 104. The sample image data Sm is obtained by reading a printed sample. In an example, the printed sample is a sample for color conversion.

The document image data Im is image data for printing an image from the image forming apparatus 100. The document image data Im is an example of conversion target image data. The conversion target image data is image data to be subjected to color conversion using a color conversion table to make the color of a printed material to be output from the image forming apparatus 100 based on image data match the color of a printed sample.

The image forming apparatus 100 outputs a printed material based on image data obtained by subjecting the conversion target image data to color conversion using the color conversion table to make the color of the printed material to be output match the color of the printed sample. The conversion target image data is not limited to the document image data Im. In an example, the conversion target image data is read image data that is obtained from an existing printed material that is read by a reading device such as the scanner 104.

The color conversion correction data generation device 200 includes a rasterization unit 201, a position association unit 202, a chromaticity value acquisition unit 203, a chromaticity value association unit 204, a correction data generation unit 205, and an output unit 206.

The rasterization unit 201 converts the document image data Im input from the input device 105 into raster image data Im1. In this embodiment, the document image data Im is represented in a CMYK color space with cyan (C), magenta (M), yellow (Y), and black (K) as reference colors. The rasterization unit 201 converts the document image data Im, which is represented in the CMYK color space, into the raster image data Im1, which is represented in a Lab color space.

The position association unit 202 receives the raster image data Im1 from the rasterization unit 201 and the sample image data Sm from the scanner 104. The position association unit 202 performs pixel alignment processing between the sample image data Sm and the raster image data Im1. Examples of a method for the pixel alignment processing include pattern matching and a phase-only correlation method. The position association unit 202 may perform geometric transformation such as affine transformation to perform the pixel alignment processing.

The chromaticity value acquisition unit 203 acquires first chromaticity values C1 and second chromaticity values C2. The first chromaticity values C1 are each a chromaticity value of temporary converted image data Im2 obtained from the raster image data Im1 subjected to color conversion using the color conversion table 120. The second chromaticity values C2 are each a chromaticity value of the sample image data Sm.

The color conversion table 120 is stored in the storage device 102 in advance. The color conversion table 120 may be an existing color conversion table. In an example, the color conversion table 120 is based on sRGB for an RGB color space with red (R), green (G), and blue (B) as basic colors. In another example, the color conversion table 120 is based on JapanColor for the CMYK color space.

The chromaticity value acquisition unit 203 converts the sample image data Sm, which is input from the scanner 104 and is represented in the RGB color space, into a form represented by the Lab color space, and then acquires the second chromaticity values C2.

The first chromaticity values C1 and the second chromaticity values C2 are represented in the Lab color space. The RGB color space is an example of a first color space for representing the sample image data Sm. The Lab color space is an example of a second color space.

In an example, the conversion of the sample image data Sm from the RGB color space to the Lab color space may be performed by the position association unit 202 before the processing performed by the chromaticity value acquisition unit 203.

In an example, the chromaticity value acquisition unit 203 acquires a first chromaticity value C1 and a second chromaticity value C2 for each of the pixels included in the raster image data Im1 and the sample image data Sm. In another example, the chromaticity value acquisition unit 203 acquires a first chromaticity value C1 and a second chromaticity value C2 for each predetermined range such as a range of 5×5 pixels included in the raster image data Im1 and the sample image data Sm.

Table 1 presents an example of the chromaticity values of the document image data Im, the second chromaticity values C2 of the sample image data Sm, which are represented in the Lab color space, and the first chromaticity values C1 of the temporary converted image data Im2, which are represented in the Lab color space. In Table 1, each row corresponds to a pixel, and numerical values in parentheses represent chromaticity values. Table 1 presents the chromaticity values of six pixels.

TABLE 1

| Chromaticity value (CMYK) of document image data | Chromaticity value C2 (Lab) of sample image data | Chromaticity value C1 (Lab) of temporary converted image data |
|---|---|---|
| (0, 100, 100, 0) | (51, 74, 54) | (49, 75, 59) |
| (0, 84, 84, 0) | (58, 61, 49) | (55, 60, 53) |
| (0, 68, 52, 0) | (65, 48, 30) | (63, 48, 31) |
| (0, 72, 59, 0) | (63, 52, 33) | (61, 51, 36) |
| (100, 0, 84, 0) | (58, −71, 16) | (53, −78, 16) |
| (76, 0, 100, 0) | (59, −53, 44) | (62, −48, 40) |

The chromaticity value association unit 204 generates a tone curve Tc. In the tone curve Tc, the first chromaticity values C1 and the second chromaticity values C2, which are acquired by the chromaticity value acquisition unit 203, are associated with each other. The tone curve Tc is an example of chromaticity value correspondence data.

In an example, the chromaticity value association unit 204 associates, for each of the pixels included in the raster image data Im1 and the sample image data Sm, a corresponding one of the first chromaticity values C1 and a corresponding one of the second chromaticity values C2 with each other. In another example, the chromaticity value association unit 204 associates, for each predetermined range such as a range of 5×5 pixels in the raster image data Im1 and the sample image data Sm, a corresponding one of the first chromaticity values C1 and a corresponding one of the second chromaticity values C2 with each other.

As described below with reference to FIG. 5, for example, the chromaticity value association unit 204 plots the first chromaticity values C1 and the second chromaticity values C2 for the respective pixels in a graph to generate the tone curve Tc.

The correction data generation unit 205 curve-fits the tone curve Tc generated by the chromaticity value association unit 204 to generate the color conversion correction data Dt. In an example, the color conversion correction data Dt is data obtained by curve-fitting the tone curve Tc. In another example, the color conversion correction data Dt is a mathematical formula or a lookup table. In the case of the Lab space, the correction data generation unit 205 generates the color conversion correction data Dt for each of L*, a*, and b*.

The output unit 206 outputs the color conversion correction data Dt generated by the correction data generation unit 205. In this embodiment, the output unit 206 outputs the color conversion correction data Dt to the color conversion unit 210. In another embodiment, the output unit 206 outputs the color conversion correction data Dt to the storage device 102 or a device outside the image forming apparatus 100.

The color conversion unit 210 performs color conversion of the document image data Im by using the color conversion table 120 and the color conversion correction data Dt output from the color conversion correction data generation device 200. Specifically, before the image forming apparatus 100 performs printing based on the document image data Im, the color conversion unit 210 can perform color conversion of the document image data Im by using the color conversion table 120 and then further correct the color of the document image data Im, which has been subjected to the color conversion, by using the color conversion correction data Dt.

Example Process for Generating Color Conversion Correction Data by Arithmetic Device 101

Figure 4:
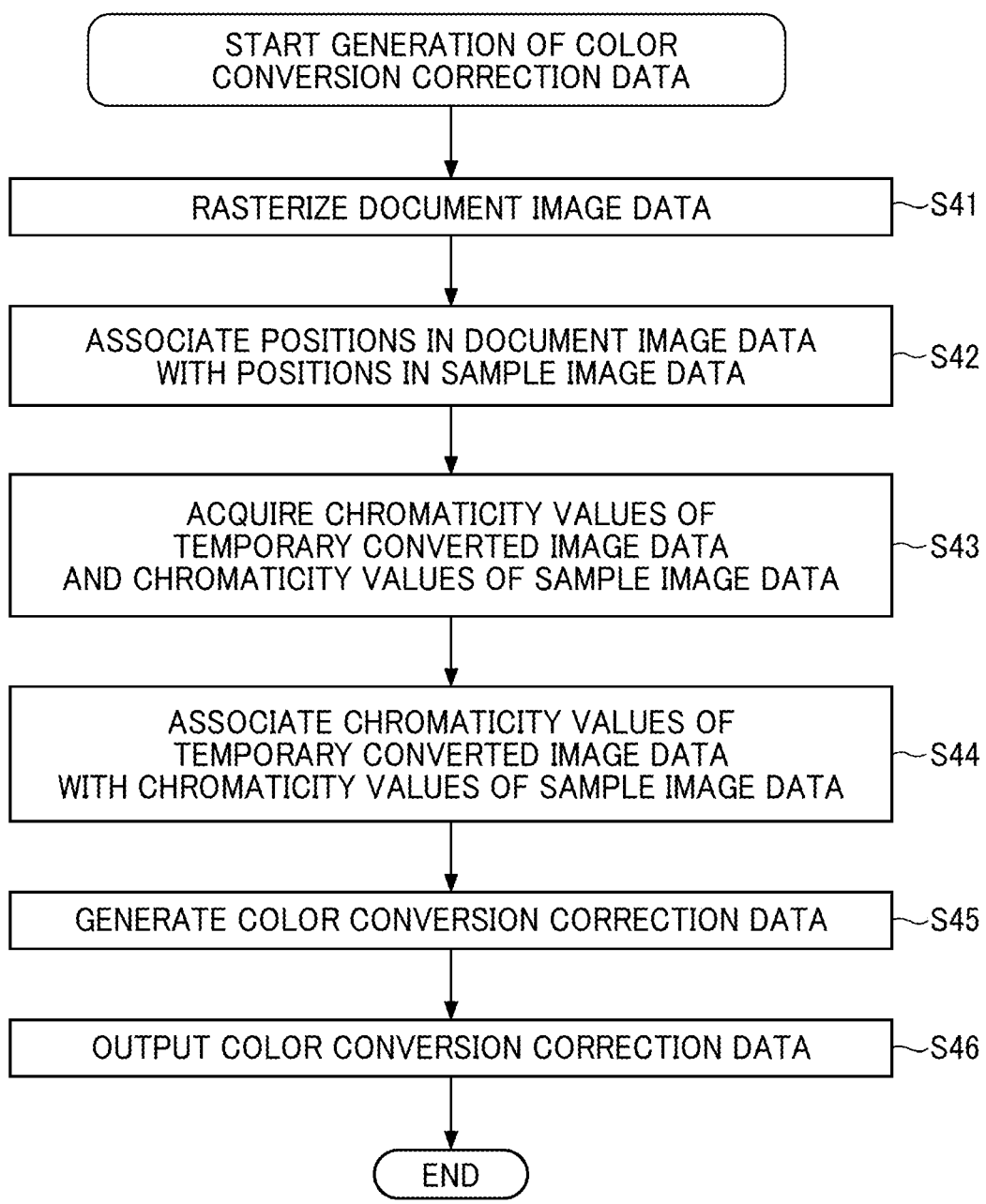
FIG. 4 is a flowchart illustrating an example of a process performed by the arithmetic device according to one or more embodiment of the present disclosure.

FIG. 4 is a flowchart illustrating an example process for generating color conversion correction data by the arithmetic device 101. In an example, the arithmetic device 101 starts the process illustrated in FIG. 4 in response to an operation input to the image forming apparatus 100.

First, in step S41, the rasterization unit 201 of the arithmetic device 101 converts the document image data Im input from the input device 105 into the raster image data Im1.

Then, in step S42, the position association unit 202 of the arithmetic device 101 performs pixel alignment processing between the sample image data Sm and the raster image data Im1.

Then, in step S43, the chromaticity value acquisition unit 203 of the arithmetic device 101 acquires first chromaticity values C1 and second chromaticity values C2. The first chromaticity values C1 are each a chromaticity value of temporary converted image data Im2 obtained from the raster image data Im1 subjected to color conversion using the color conversion table 120. The second chromaticity values C2 are each a chromaticity value of the sample image data Sm.

Then, in step S44, the chromaticity value association unit 204 of the arithmetic device 101 generates the tone curve Tc in which the first chromaticity values C1 and the second chromaticity values C2, which are acquired by the chromaticity value acquisition unit 203, are associated with each other.

Then, in step S45, the correction data generation unit 205 of the arithmetic device 101 curve-fits the tone curve Tc generated by the chromaticity value association unit 204 to generate the color conversion correction data Dt.

Then, in step S46, the output unit 206 of the arithmetic device 101 outputs the color conversion correction data Dt generated by the correction data generation unit 205 to the color conversion unit 210.

Accordingly, the arithmetic device 101 can perform a process for generating the color conversion correction data Dt.

First Embodiment

Example of Tone Curve Tc and Color Conversion Correction Data Dt

Figure 5:
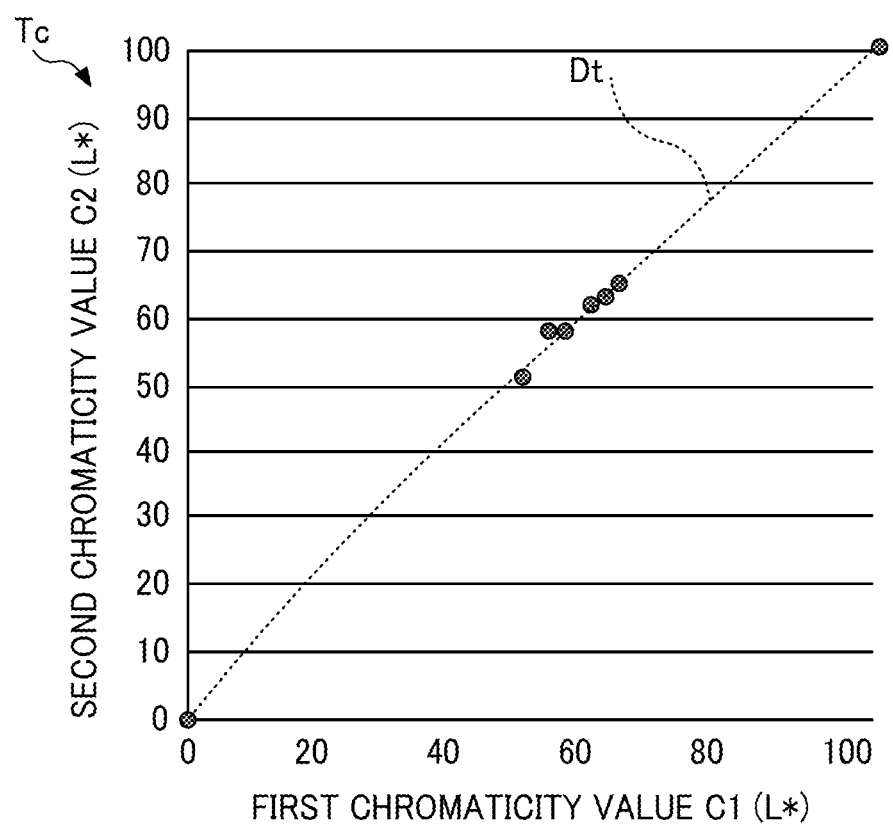
FIG. 5 is a graph illustrating a tone curve and color conversion correction data according to a first embodiment of the present disclosure.

FIG. 5 is a diagram illustrating the color conversion correction data Dt for L* according to a first embodiment. In FIG. 5, the horizontal axis represents the first chromaticity values C1, and the vertical axis represents the second chromaticity values C2. The color conversion correction data Dt for L* is illustrated in FIG. 5, by way of example. In another example, the arithmetic device 101 generates the color conversion correction data Dt for each of a* and b*.

In FIG. 5, the color conversion correction data Dt, which is indicated by a broken line, is an approximate curve obtained by curve-fitting the tone curve Tc.

In an existing method, to achieve desired color reproduction, an image forming apparatus prints a color conversion table creation chart including a plurality of color patches, reads the printed color conversion table creation chart, and then generates a color conversion table from the data of the read color conversion table creation chart.

An apparatus for generating a color conversion table is disclosed. Such an apparatus reads a desired printed material and a printed material output from a printer and generates a color conversion table from a correspondence relationship between the chromaticity values of points in the desired printed material and the chromaticity values of corresponding points in the printed material output from the printer.

Also disclosed is a technique for making colors from a printer match colors of a sample for the printer. In the disclosed technique, to improve the reproduction accuracy of a specific color, an output color value of the specific color is predicted from a correspondence relationship between sample data and measured color values, and the correspondence relationship between the sample data and the measured color values is corrected in accordance with a difference between the predicted output color value and a target color value.

In the related art, however, if a color conversion table is used for a printed material other than a printed material used to generate the color conversion table, a gradation difference may occur, for example, resulting in insufficient color reproduction accuracy. The gradation difference is a difference between the gradation levels of consecutive colors. The gradation difference is likely to occur in the reproduction of colors not included in the printed material used to generate the color conversion table because not all of the colors are included in the printed material.

In this embodiment, the color conversion correction data generation device 200 includes the chromaticity value acquisition unit 203 to acquire the first chromaticity values C1, which are obtained from the document image data Im (i.e., the conversion target image data), and the second chromaticity values C2 of the sample image data Sm, which is obtained by reading a printed sample. The color conversion correction data generation device 200 also includes the output unit 206 to output the color conversion correction data Dt, which is generated by curve-fitting the tone curve Tc (chromaticity value correspondence data) in which the first chromaticity values C1 and the second chromaticity values C2 acquired by the chromaticity value acquisition unit 203 are associated with each other.

In the color conversion table 120, color loss may occur if a color is not included in the printed material used to generate the color conversion table 120. In this embodiment, such color loss is interpolated by curve-fitting the tone curve Tc. As a result, the occurrence of a gradation difference may be reduced. This embodiment can provide a color conversion correction data generation device with reduced occurrence of a gradation difference and improved color reproduction accuracy of color conversion using a color conversion table.

In this embodiment, furthermore, the chromaticity value acquisition unit 203 converts the sample image data Sm, which is represented in the RGB color space (first color space), into a form represented by the Lab color space (second color space), and then acquires the second chromaticity values C2. In the RGB color space, for example, variations in the characteristics of a reading device such as the scanner 104 may cause a reduction in color reproducibility. In this embodiment, the second chromaticity values C2 of the sample image data Sm, which is represented in the Lab color space, can reduce the possible influence of variations in the characteristics of the reading device. As a result, color conversion accuracy can be improved.

In this embodiment, as a non-limiting example, the first chromaticity values C1 and the second chromaticity values C2, which are represented in the Lab color space, are used. In another example, the color conversion correction data generation device 200 may generate the color conversion correction data Dt by using first chromaticity values C1 and the second chromaticity values C2, which are represented in the CMYK color space or the RGB color space.

In the image forming apparatus 100 according to this embodiment, as a non-limiting example, the color conversion unit 210 corrects the document image data Im, which is subjected to color conversion using the color conversion table 120, by using the color conversion correction data Dt. In another example, the color conversion unit 210 may perform color conversion by any other suitable method. The color conversion unit 210 may update the color conversion table 120 by using the color conversion correction data Dt. In an example, the color conversion table 120 having chromaticity values at grid points of a multi-dimensional lookup table may be updated by the color conversion unit 210 correcting the chromaticity values of the grid points by using the color conversion correction data Dt.

Second Embodiment

Next, a color conversion correction data generation device 200a according to a second embodiment will be described. In the second embodiment, substantially the same elements as those in the first embodiment are denoted by the same reference numerals, and redundant descriptions thereof will be omitted.

In this embodiment, the first chromaticity values C1 are grouped to form a plurality of chromaticity groups, and the second chromaticity values C2 are grouped to form a plurality of chromaticity groups. The color conversion correction data Dt is generated for each chromaticity group of first chromaticity values C1 and for each chromaticity group of second chromaticity values C2 and is output from the output unit 206.

Figure 6:
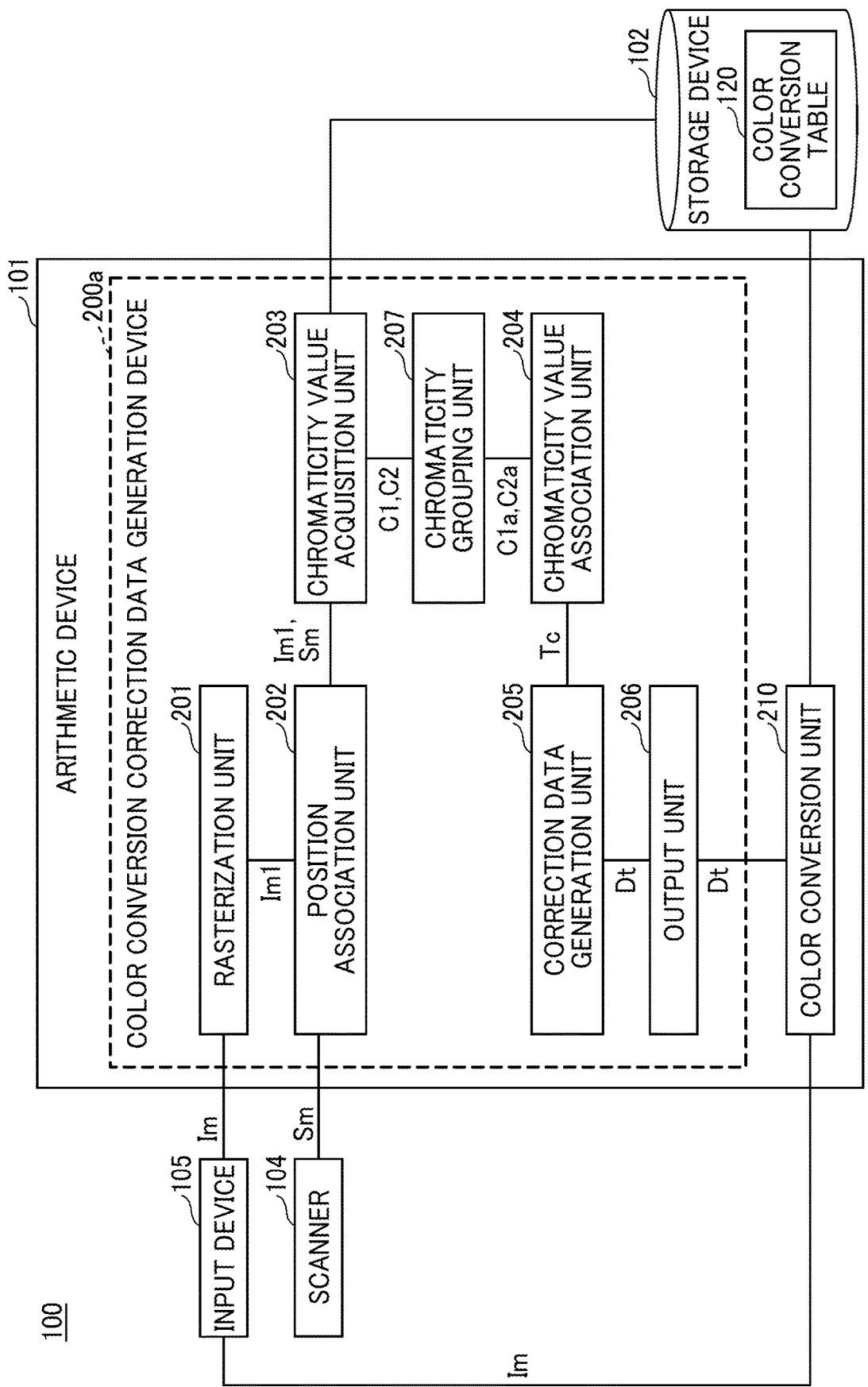
FIG. 6 is a block diagram illustrating an example functional configuration of a color conversion correction data generation device according to a second embodiment of the present disclosure.

FIG. 6 is a block diagram illustrating an example functional configuration of the color conversion correction data generation device 200a.

The color conversion correction data generation device 200a includes a chromaticity grouping unit 207.

The chromaticity grouping unit 207 groups the first chromaticity values C1 received from the chromaticity value acquisition unit 203 to form a plurality of hue groups, and groups the second chromaticity values C2 received from the chromaticity value acquisition unit 203 to form a plurality of hue groups.

The chromaticity value association unit 204 generates a tone curve Tc for each hue group, based on grouped first chromaticity values C1a and grouped second chromaticity values C2a. The correction data generation unit 205 generates color conversion correction data Dt for each hue.

The chromaticity grouping unit 207 may perform grouping by using saturation or lightness instead of hue, or may perform grouping by using a plurality of color characteristics such as hue and lightness.

The hue can be calculated by $\tan^{-1}(b^*/a^*)$ by using the a* value and the b* value in the Lab values. In Table 2 below, the hue is added to Table 1. In Table 2, the h value in the rightmost column represents the hue.

TABLE 2

| Chromaticity value (CMYK) of document image data | Chromaticity value (Lab) of sample image data | Chromaticity value (Lab) of temporary converted image data | Chromaticity value (LCh) of temporary converted image data |
| --- | --- | --- | --- |
| (0, 100, 100, 0) | (51, 74, 54) | (49, 75, 59) | (49, 92, 36) |
| (0, 84, 84, 0) | (58, 61, 49) | (55, 60, 53) | (55, 78, 39) |
| (0, 68, 52, 0) | (65, 48, 30) | (63, 48, 31) | (63, 57, 32) |
| (0, 72, 59, 0) | (63, 52, 33) | (61, 51, 36) | (61, 62, 32) |
| (100, 0, 84, 0) | (58, −71, 16) | (53, −78, 16) | (53, 73, −13) |
| (76, 0, 100, 0) | (59, −53, 44) | (62, −48, 40) | (62, 62, −40) |

Figure 7:
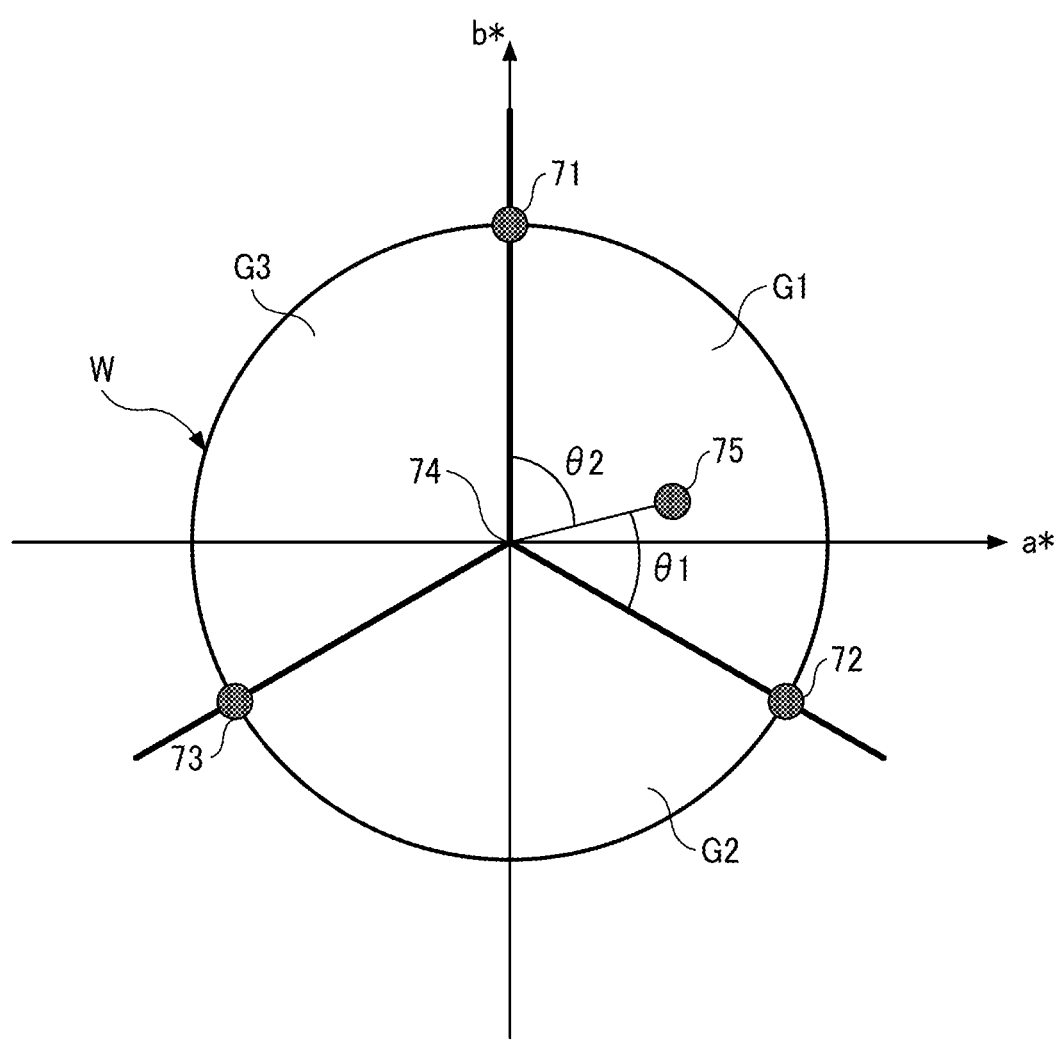
FIG. 7 is a diagram illustrating an example of grouping of hues according to the second embodiment of the present disclosure.

FIG. 7 is a diagram illustrating an example of grouping of hues. FIG. 7 illustrates an example in which a circle W representing the Lab color space is grouped to form three groups for respective hues. In the example illustrated in FIG. 7, the circle W is grouped to form three groups: a group G1 representing a fan-shaped area including a point 71 and a point 72; a group G2 representing a fan-shaped area including the point 72 and a point 73; and a group G3 representing a fan-shaped area including the point 73 and the point 71.

A tone curve Tc may be generated in each of the groups G1, G2, and G3. In this case, however, the continuity of the colors is not likely to be maintained. In this embodiment, a tone curve Tc is generated in each of a boundary region between the groups G1 and G2, a boundary region between the groups G2 and G3, and a boundary region between the groups G3 and G1. The generated tone curves Tc are interpolated to generate tone curves in regions other than the boundary region between the groups G1 and G2, the boundary region between the groups G2 and G3, and the boundary region between the groups G3 and G1. The boundary region between the groups G1 and G2 corresponds to a region on a line connecting the point 72 and a center 74, the boundary region between the groups G2 and G3 corresponds to a region on a line connecting the point 73 and the center 74, and the boundary region between the groups G3 and G1 corresponds to a region on a line connecting the point 71 and the center 74.

Specifically, a tone curve Tc1 is generated in the boundary region between the groups G1 and G2, and a tone curve Tc2 is generated in the boundary region between the groups G2 and G3. The angle defined between a line connecting a point 75 and the center 74 and the line connecting the point 72 and the center 74 is represented by θ1, and the angle defined between the line connecting the point 75 and the center 74 and the line connecting the point 71 and the center 74 is represented by θ2. The tone curve Tc at the point 75 is represented by Expression (1) below.

$$\left(\left(\frac{\theta 2}{60}\right) \times Tc1(x) + \frac{(\theta 1)}{60} \times Tc2(x)\right) \tag{1}$$

The color conversion correction data generation device 200a may perform interpolation processing further using a tone curve Tc0 at the center 74 with a saturation of 0 to calculate the tone curve Tc at the point 75.

If the tone curve Tc is unknown, applying tone curves of colors obtained in advance to Expression (1) yields equations for a plurality of tone curves. The color conversion correction data generation device 200a solves the obtained equations using the least-squares method or the like to calculate an optimum tone curve. In an example, the color conversion correction data generation device 200a does not generate a tone curve for a group including no color as a result of the grouping.

The color conversion correction data generation device 200a generates the color conversion correction data Dt for each of the pluralities of chromaticity groups. The generation of the color conversion correction data Dt for each of the pluralities of chromaticity groups can further reduce the occurrence of a gradation difference and improve color conversion accuracy, as compared to the generation of the color conversion correction data Dt using the entire color space.

OTHER EMBODIMENTS

In the first and second embodiments described above, the second chromaticity values of the sample image data Sm are converted by using a tone curve Tc. In some embodiments, a tone curve is generated after the second chromaticity values are converted into a different color space.

In an embodiment, the chromaticity values of the document image data Im are corrected without changing the color conversion table 120 to make the color of the printed material match the color of the printed sample. In this embodiment, in an example, input chromaticity values for outputting target chromaticity values are searched for using the color conversion table 120, and a relationship between the input chromaticity values and the chromaticity values of the document image data Im is used as a tone curve.

A method for correcting the chromaticity values of the document image data Im will now be described. The chromaticity values acquired from the sample image data Sm are subjected to an inverse transform using a temporary color conversion table and are converted into the same color space as that of the chromaticity values of the document image data Im.

In Table 3 below, the rightmost column represents the chromaticity values of the sample image data Sm subjected to an inverse transform using the color conversion table. The chromaticity values are represented in the CMYK color space.

TABLE 3

| Chromaticity value (CMYK) of document image data | Chromaticity value (Lab) of sample image data | Chromaticity value (CMYK) of sample image data subjected to inverse transform using color conversion table |
| --- | --- | --- |
| (0, 100, 100, 0) | (51, 74, 54) | (0, 100, 97, 0) |
| (0, 84, 84, 0) | (58, 61, 49) | (0, 85, 82, 0) |
| (0, 68, 52, 0) | (65, 48, 30) | (0, 70, 51, 0) |
| (0, 72, 59, 0) | (63, 52, 33) | (0, 75, 56, 0) |
| (100, 0, 84, 0) | (58, −71, 16) | (95, 0, 80, 0) |
| (76, 0, 100, 0) | (59, −53, 44) | (75, 8, 97, 0) |

The color conversion correction data generation device 200 or 200a creates a tone curve in which chromaticity values of the document image data Im are associated with chromaticity values obtained from the sample image data Sm subjected to an inverse transform. Also in this case, the color conversion correction data generation device 200 or 200a can correct the document image data Im subjected to color conversion using the color conversion table 120.

In an example, the input of the color conversion table 120 is corrected by using a tone curve and is further subjected to color conversion using the color conversion table 120. In an example, the results of the color conversion are stored as the chromaticity values of the corresponding grid points.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

The embodiments also include a color conversion correction data generation method. In an embodiment, the color conversion correction data generation method is performed by a color conversion correction data generation device. In the color conversion correction data generation method, an acquisition unit of the color conversion correction data generation device acquires first chromaticity values obtained from conversion target image data and second chromaticity values of sample image data that is obtained by reading a printed sample, and an output unit of the color conversion correction data generation device outputs color conversion correction data generated by curve-fitting chromaticity value correspondence data in which the first chromaticity values and the second chromaticity values acquired by the acquisition unit are associated with each other. The color conversion correction data generation method described above can provide advantages similar to those of the color conversion correction data generation device described above. The color conversion correction data generation method may be implemented by a circuit such as a CPU, a large-scale integrated (LSI) circuit, an integrated circuit (IC) card, a standalone module, or the like.

The embodiments also include a program. In an embodiment, the program causes a color conversion correction data generation device to execute a process including acquiring, by an acquisition unit, first chromaticity values obtained from conversion target image data and second chromaticity values of sample image data that is obtained by reading a printed sample; and outputting, by an output unit, color conversion correction data generated by curve-fitting chromaticity value correspondence data in which the first chromaticity values and the second chromaticity values acquired by the acquisition unit are associated with each other. The program described above can provide advantages similar to those of the color conversion correction data generation device described above.

In addition, all of the numerals in the foregoing description, such as ordinal numbers and quantities, are presented as examples to specifically describe the technique disclosed herein, and the present disclosure is not limited to the presented numerals. Further, the connection relationship between the components is presented as an example to specifically describe the technique disclosed herein, and the connection relationship for implementing the functions disclosed herein is not limited to that described above.

Each of the functions of the embodiments described above may be implemented by one or more processing circuits or circuitry. As used herein, the term "processing circuit or circuitry" includes a processor programmed to implement each function by software, such as a processor implemented by an electronic circuit, and devices designed to implement the functions described above, such as an ASIC, a digital signal processor (DSP), a field programmable gate array (FPGA), and existing circuit modules.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:
a color conversion correction data generation device for generating color conversion correction data, the color conversion correction data generation device comprising first circuitry configured to:
acquire first chromaticity values obtained from conversion target image data and second chromaticity values of sample image data, the conversion target image data being image data to be subjected to color conversion, the sample image data being obtained by reading a printed sample;
curve-fit chromaticity value correspondence data to generate color conversion correction data, the chromaticity value correspondence data being data in which the acquired first chromaticity values and the acquired second chromaticity values are associated with each other; and
output the color conversion correction data for correcting image data obtained by subjecting the conversion target image data to the color conversion,
second circuitry configured to perform color conversion on the conversion target image data to be subjected to color conversion by using the color conversion correction data output from the color conversion correction data generation device and a color conversion table; and
an image forming device configured to form an image based on the image data to which the color conversion is applied,
wherein
the first chromaticity values and the second chromaticity values are each grouped into a plurality of chromaticity groups, and
the first circuitry is configured to generate and output color conversion correction data for each of the plurality of chromaticity groups of the first chromaticity values and each of the plurality of chromaticity groups of the second chromaticity values.

2. The image forming apparatus according to claim 1, wherein
the sample image data is represented in a first color space, and
the first circuitry is configured to acquire the second chromaticity values after converting the sample image data represented in the first color space to a form represented in a second color space.

3. The image forming apparatus according to claim 1, wherein
the first chromaticity values and the second chromaticity values are each grouped into the plurality of chromaticity groups of the first chromaticity values and the second chromaticity values, respectively, based on a hue.

4. The image forming apparatus according to claim 1, wherein
the first chromaticity values and the second chromaticity values are grouped into the plurality of chromaticity groups of the first chromaticity values and the second chromaticity values, respectively, based on a saturation.

5. The image forming apparatus according to claim 3, wherein
the first chromaticity values and the second chromaticity values are each grouped into the plurality of chromaticity groups of the first chromaticity values and the second chromaticity values, respectively, based on a plurality of color characteristics.

6. A method for forming an image by using color conversion correction data, comprising:
acquiring first chromaticity values obtained from conversion target image data and second chromaticity values of sample image data, the conversion target image data being image data to be subjected to color conversion, the sample image data being obtained by reading a printed sample;
curve-fitting chromaticity value correspondence data to generate color conversion correction data, the chromaticity value correspondence data being data in which the acquired first chromaticity values and the acquired second chromaticity values are associated with each other;
outputting the color conversion correction data for correcting image data obtained by subjecting the conversion target image data to the color conversion,
performing color conversion on the conversion target image data to be subjected to color conversion by using the color conversion correction data output from the color conversion correction data generation device and a color conversion table; and
forming an image based on the image data to which the color conversion is applied
wherein
the first chromaticity values and the second chromaticity values are each grouped into a plurality of chromaticity groups, and
the method further comprises generating and outputting the color conversion correction data for each of the plurality of chromaticity groups of the first chromaticity values and each of the plurality of chromaticity groups of the second chromaticity values.

7. A non-transitory recording medium which, when executed by one or more processors, causes the processors to perform a method for forming an image by using color conversion correction data, comprising:
acquiring first chromaticity values obtained from conversion target image data and second chromaticity values of sample image data, the conversion target image data being image data to be subjected to color conversion, the sample image data being obtained by reading a printed sample;
curve-fitting chromaticity value correspondence data to generate color conversion correction data, the chromaticity value correspondence data being data in which the acquired first chromaticity values and the acquired second chromaticity values are associated with each other; and
outputting the color conversion correction data for correcting image data obtained by subjecting the conversion target image data to the color conversion,
performing color conversion on the conversion target image data to be subjected to color conversion by using the color conversion correction data output from the color conversion correction data generation device and a color conversion table; and forming an image based on the image data to which the color conversion is applied wherein the first chromaticity values and the second chromaticity values are each grouped into a plurality of chromaticity groups, and the method further comprises generating and outputting the color conversion correction data for each of the plurality of chromaticity groups of the first chromaticity values and each of the plurality of chromaticity groups of the second chromaticity values.

* * * * *